United States Patent [19] [11] 4,235,410
Nelson [45] Nov. 25, 1980

[54] REINFORCEMENT PANEL AND MOLD FOR MAKING SAME
[75] Inventor: Gullmar V. Nelson, Durham, N.H.
[73] Assignee: McCord Corporation, Detroit, Mich.
[21] Appl. No.: 94,777
[22] Filed: Nov. 16, 1979

Related U.S. Application Data
[62] Division of Ser. No. 13,838, Feb. 22, 1979.

[51] Int. Cl.² ............................................. B29F 1/00
[52] U.S. Cl. ..................................... 249/60; 249/142
[58] Field of Search ................................ 249/60, 142

[56] References Cited
U.S. PATENT DOCUMENTS

| 2,566,817 | 9/1951 | Yellin | 249/60 |
| 2,892,339 | 6/1959 | Flower et al. | 249/60 X |
| 3,795,382 | 3/1974 | Gruber et al. | 249/60 |

Primary Examiner—J. Howard Flint, Jr.
Attorney, Agent, or Firm—McGlynn and Milton

[57] ABSTRACT

A mold assembly is disclosed for making a reinforcing panel structure including female and male molds with each mold having a base surface with four sided projections extending upwardly from the base surface to a raised surface. The projections of each mold are spaced from the next adjacent projection in that mold in a first direction a distance equal to the dimension of the projection in that direction plus a predetermined dimension which is double the thickness of the rib of the panel and with each projection spaced from the next adjacent projection in that mold in a second direction perpendicular to the first direction a distance equal to the dimension of the projection in that second direction plus a predetermined dimension which is double the thickness of the rib of the panel. Each of the projections have embossments thereon. When the molds are mated the projections of one mold are disposed in the spaces between the projections of the other mold and are spaced therefrom by the predetermined dimensions or the thickness of the ribs and the embossments on the projections engage the base surface of the opposite mold.

1 Claim, 5 Drawing Figures 4,235,410

REINFORCEMENT PANEL AND MOLD FOR MAKING SAME

This is a division, of application Ser. No. 13,838, filed Feb. 22, 1979.

BACKGROUND OF THE INVENTION

1. Field of the Invention

The subject invention relates to a reinforcing panel and, particularly, to a reinforcing panel which is particularly well-suited for reinforcing plastic sheets such as those utilized in automotive vehicle body components and to a mold for making such a reinforcing panel.

2. Description of the Prior Art

There are various reinforcing panels known to the prior art; however, because of their construction they usually have an inherent weakness in certain directions and/or have localized areas of high stress. Other reinforcing panels because of their structure or configuration have high weight to strength ratios and are, therefore, unsuitable for specified uses.

SUMMARY OF THE INVENTION

In accordance with the invention there is provided a mold assembly for molding a reinforcing panel including male and female molds with each of the molds having a base surface with projections extending upwardly from the base surface to a raised surface with each of the projections on each mold being spaced from the next adjacent projection in the same mold in a first direction a distance equal to the dimension of a projection of the opposite mold in that direction plus a predetermined dimension and which projections are spaced from the next adjacent projection in the same mold in a second direction transverse to the first direction a distance which is equal to the dimension of another projection of the opposite mold in that second direction plus a predetermined dimension so that the projections of the female mold are disposed in the spaces between the projections of the male mold and are spaced from each other by the predetermined dimensions when the molds are mated.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

A preferred embodiment of a reinforcing panel structure fabricated in accordance with the subject invention is generally indicated at 10.

Figure 1:
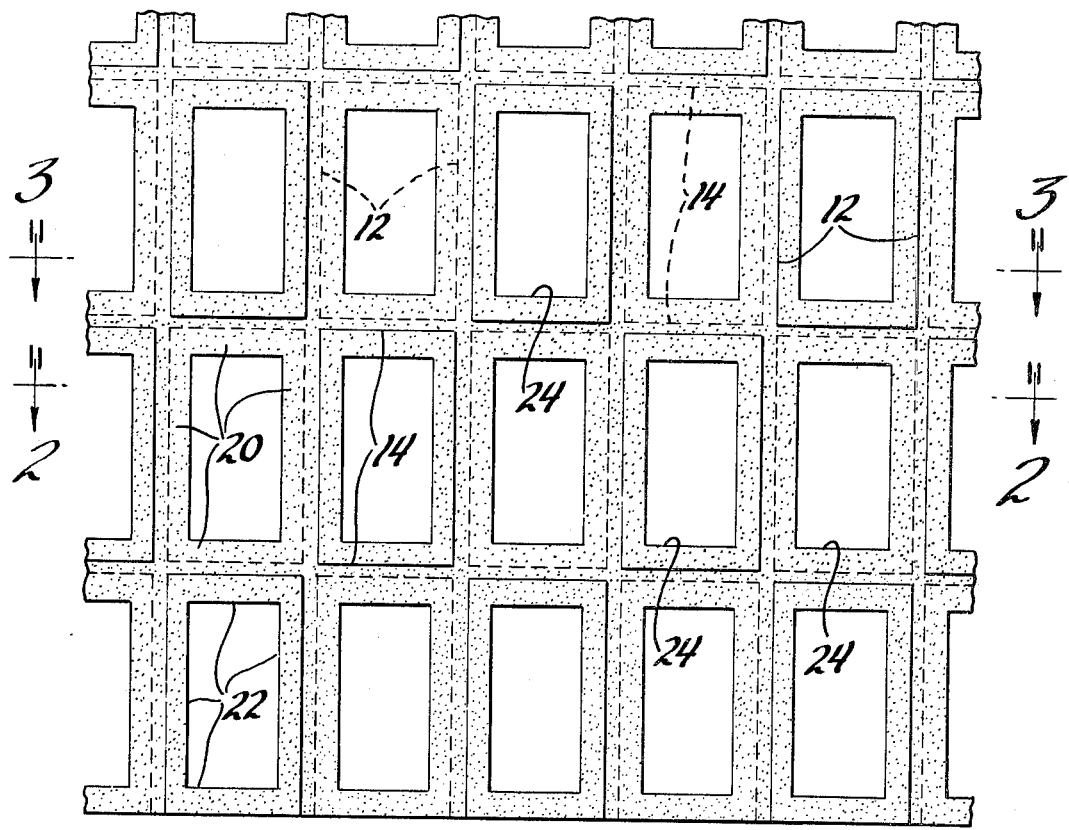
FIG. 1 is a fragmentary view of one face of a preferred embodiment of a reinforcing panel structure constructed in accordance with the subject invention.

The panel 10 includes a first plurality of spaced parallel ribs 12. Also included is a second plurality of spaced parallel ribs 14 which extend transversely or perpendicularly to and intersect the first plurality of ribs 12 to define a plurality of four sided areas, i.e., quadrangles or rectangles. As is clear from FIG. 1, each of the ribs 12 and 14 defines one side of two four sided areas and extends or is continuous through multiple four sided areas.

Figure 2:
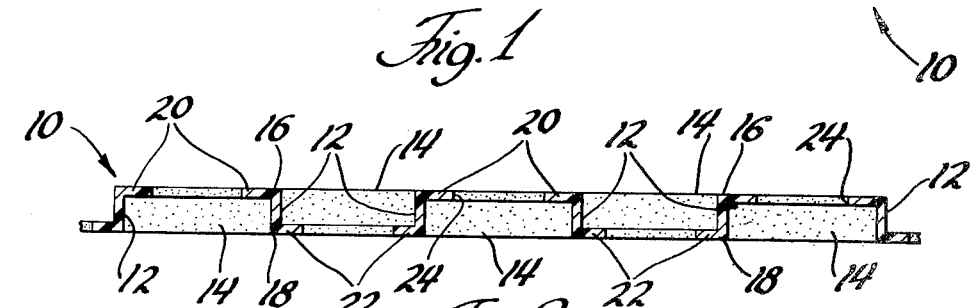
FIG. 2 is a cross-sectional view taken substantially along line 2—2 of FIG. 1.
Figure 3:
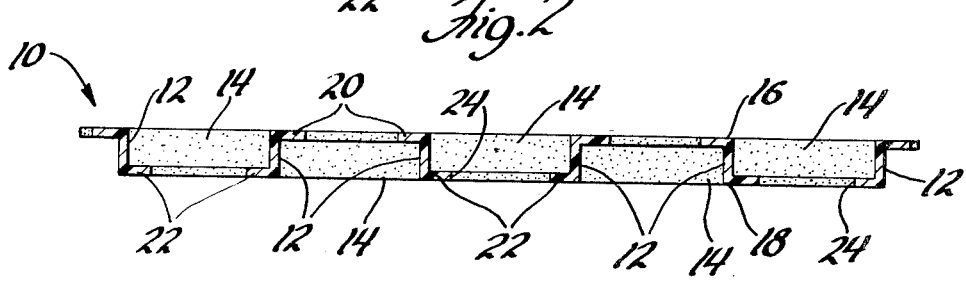
FIG. 3 is a cross-sectional view taken substantially along line 3—3 of FIG. 1.
Figure 4:
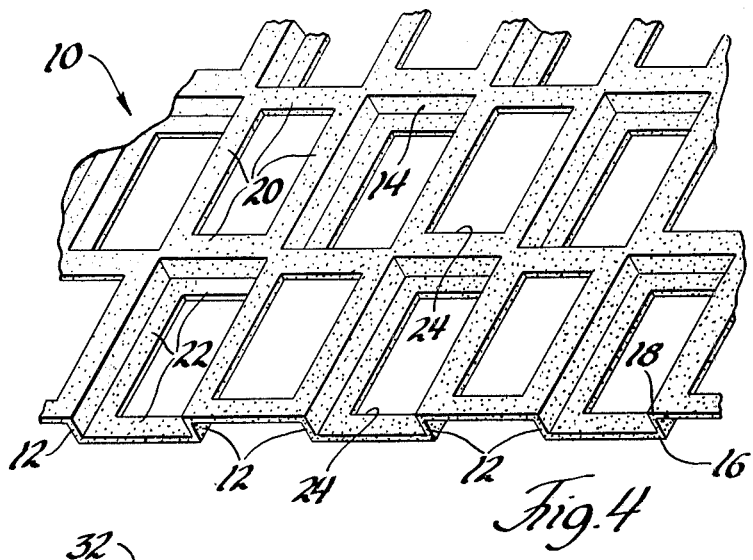
FIG. 4 is a fragmentary perspective view of the panel structure illustrated in FIGS. 1 through 3.

Each of the ribs 12 and 14 has top and bottom parallel edges as illustrated at 16 and 18 for the ribs 12 in FIGS. 2, 3 and 4, it being appreciated that the transverse ribs 14 have similar top and bottom edges. The top and bottom edges 16 and 18 of each rib are connected by generally parallel sides. The sides of all of the ribs 12 and 14 are generally parallel to one another. The sides of the ribs 12 and 14 are generally parallel in the sense that they are disposed at a slight draft angle in the range of 1° to 3°, preferably 1.5°, to allow for mold or die draw. In other words, the sides are at an angle of approximately 1.5° in opposite directions on opposite sides of each rib to allow the part to be easily removed from the mold, although the sides of each rib are parallel. Such a slight angle is common in plastic molding.

Each of the ribs 12 and 14 have an integral sheet extending transversely from each of the opposite edges thereof. The sheets 20 extending from the one or top edge 16 of each of the ribs 12 and 14 extends in one direction only from that top edge whereas the sheet 22 extending from the opposite or bottom edge 18 of each rib 12 and 14 extends only in the opposite direction. The sheets extending from intersecting ribs 12 and 14 are integral with one another. In other words, each of the ribs 12 and 14 has an integral sheet extending transversely from the opposite edges 16 and 18 thereof with the sheet 20 extending from the top edge 16 of each rib 12 and 14 extending in one direction only and with the sheet 22 at the opposite edge 18 of that rib 12 or 14 extending only in the opposite direction.

The ribs 12 and 14 define alternate four sided areas or quadrangles in transverse directions and the alternate four sided areas or quadrangles have integral sheets 20 interconnecting one extremity of the ribs 12 and 14 whereas the ribs 12 and 14 defining the remaining alternate four sided areas have integral sheets 22 interconnecting the opposite extremity of the ribs 12 and 14. In other words, the sheets 20 of alternate four sided areas are disposed in a first plane and the sheets 22 of the remaining four sided areas are disposed in a second plane which is spaced from and parallel to the first plane. Each of the four sided areas and the sheets 20 and 22 define a box-like cavity with the alternate box-like cavities opening in opposite directions as is best illustrated in FIG. 4. Additionally, the adjacent box-like cavities are separated by the thickness of the ribs 12 and 14. All of the ribs 12 and 14 are of equal thickness, i.e., of the same thickness.

Each of the sheets 20 and 22 interconnecting the edges 16 and 18 of the ribs 12 and 14 defining each four sided area has an opening 24 therethrough. Each of the openings 24 defines a quadrangle or area which is proportional to but smaller than the quadrangle or area defined by the adjacent ribs 12 and 14.

As will be appreciated from the foregoing description in connection with the drawings, each of the ribs 12 and 14 are continuous and extend through a number of four sided areas or quadrangles. The holes or openings 24 in the oppositely disposed sheets are not necessary but they do reduce the weight of the panel without a proportional reduction in the strength of the panel. The importance of the ribs 12 and 14 extending continuously is to provide a high strength panel. The design of the panel is such that it enjoys a high section modulus as a maximum amount of material is disposed away from the neutral axis.

Figure 5:
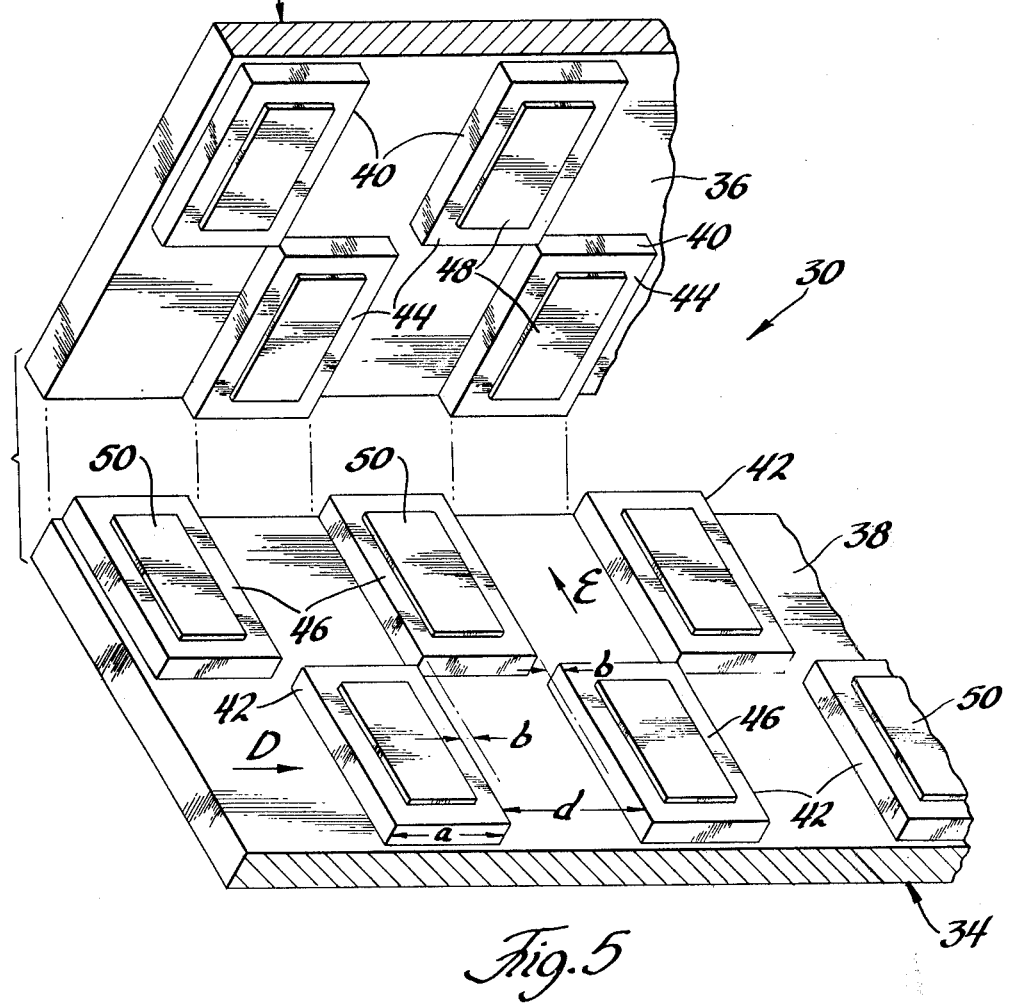
FIG. 5 is a fragmentary perspective view of a preferred embodiment of a mold assembly constructed in accordance with the subject invention for making the panel structure illustrated in FIGS. 1 through 4.

Turning to FIG. 5 there is disclosed a mold assembly for making the reinforcing panel structure illustrated in FIGS. 1 through 4. The mold assembly is generally shown at 30 and includes a first or male mold generally indicated at 32 and a second or female mold generally indicated at 34. Each of the molds 32 and 34 has a base surface 36 and 38 respectively. Four sided or quadrangular projections 40 and 42 extend upwardly from the base surfaces 36 and 38 respectively. The projections 40 extend upwardly to raised flat surfaces 44 and the projections 42 extend upwardly to raised flat surfaces 46.

Each of the projections 42 of the mold 34 is spaced from the next adjacent projection 42 in that mold 34 in a first direction D a distance d equal to the dimension a of the projection 42 in the direction D plus a predetermined dimension b plus b. In other words, each projection 42 is spaced from the next adjacent projection 42 a distance which is equal to its width a plus twice the thickness b of the ribs 12. In a similar fashion, each projection 42 is spaced from the next adjacent projection 42 in the mold 34 in a second direction E which is perpendicular to the first direction a distance equal to the dimension of the projection 42 in the direction E plus a predetermined dimension which is b plus b, b being the thickness of the ribs 14 with the ribs 12 and 14 being of equal thickness. In a similar fashion, the projections 40 of the mold 32 are spaced from one another in exactly the same fashion. In a more general sense, each of the projections 40 and 42 of each mold 32 and 34 are spaced from the next adjacent projection in the same mold in a first direction D a distance equal to the dimension of a projection of the opposite mold in the first direction D plus a first predetermined distance and spaced from the next adjacent projection in the same mold in a second direction E transverse to the first direction D a distance equal to the dimension of another projection of the opposite mold in the second direction E plus a predetermined dimension. Thus, the projections 42 of the female mold 34 are disposed in the spaces between the projections 40 of the male mold 32 and spaced from the projections 40 of the male mold by the predetermined dimensions when the female and male molds are mated.

Thus, when the molds 32 and 34 are disposed in mated relationship the projections 40 are disposed in the spaces between the projections 42. Also, when the molds are mated, the raised surfaces 44 of the projections 40 are spaced from the base surface 38 of the mold 34 as are the raised surfaces 46 spaced from the base surface 36 of the mold 32 to thereby define the sheets 20 and 22.

Each of the projections 40 includes a four sided or rectangular embossment 48 on each of the raised surfaces 44 with each embossment 48 being smaller in area or dimension than the respective projection 40 and is proportional thereto and centered thereon. In a similar fashion each projection 42 includes a four sided or rectangular raised embossment 50 on each of the raised surfaces 46 and which is smaller in dimension and proportional to the respective projection 42. The embossments 48 of the mold 32 engage the base surface 38 of the opposite mold 34 when the molds are mated and, in a similar fashion, embossments 50 of the mold 34 engage the base surface 36 of the mold 32 when the molds are mated. Clearly, the embossments 48 and 50 define the openings 24 in the panel structure 10. It will be noted that the projections 40 and 42 are identical in size and configuration and have side walls all of which are generally parallel to one another when the molds are mated. The side walls of the projections 40 and 42 are spaced from adjacent side walls the thickness of the ribs 12 and 14 when the molds are mated and the thickness or the spacing between the side walls of adjacent projections 40 and 42 when the molds are mated are equal whereby the ribs 12 and 14 are of equal thickness. As alluded to above, the side walls of the projections 40 and 42 are at an angle of between 1° and 3° from being perpendicular to the respective base surfaces 36 and 38 to allow the molded panel to be easily removed from the molds. Of course, each side wall of each projection 40 and 42 slants inwardly at the draft angle of 1° to 3° from the respective bases 36 and 38 upwardly to the respective surfaces 44 and 46.

The mold assembly 30 is particularly suitable for forming the panel 10 of plastic material in a reaction injection molding process as the molds 32 and 34 are easily cleaned between shots as there are no crevices or hard-to-get-at places in either mold and the projections 40 of the mold 32 are spaced from one another as are the projections 42 of the mold 34. It will be appreciated that the central portion of mold 32 is identical in configuration to the central portion of mold 34, differing only at the periphery for sealing off flange requirements.

A preferred embodiment has been illustrated and described, however, other embodiments and modifications are possible under the inventive concept. By way of examples, the ribs 12 and 14 may vary in thickness and height from rib to rib in a given panel structure, and the top and bottom edges of the ribs 12 and 14 may not be parallel, as in a panel structure which is curved or arcuate only on one face. In a curved or arcuate panel, the top and bottom sheets may or may not be parallel. It will also be appreciated that the ribs may be continuous along a straight line or along a curved line and may intersect at angles other than right angles, i.e., other than perpendicular. Further, the openings 24 may be of shapes different than the shape of the projections, the importance of the openings being to reduce weight while retaining the desired structural strength or integrity of the panel. Thus, although a preferred embodiment has been illustrated and described, modifications are available.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A mold assembly for making a reinforcing panel structure, said mold assembly comprising; a female mold and a male mold, each of said molds having a base surface with four sided projections extending upwardly from said base surface to a raised surface, each of said projections of each mold being spaced from the next adjacent projection in that mold in a first direction a distance equal to the dimension of the projection in said first direction plus a predetermined dimension and spaced from the next adjacent projection in that mold in a second direction transverse to said first direction a distance equal to the dimension of the projection in said second direction plus a predetermined dimension, said projections of said female mold being disposed in the spaces between said projections of said male mold and spaced from said projections of said male mold by said predetermined dimensions when said female and male molds are mated, said raised surface of said projections of said respective molds being spaced from said base surface of the opposite mold when said molds are mated, and an embossment on each of said raised surfaces smaller in dimension than each respective projection, said embossments of said respective molds engaging said base surface of the opposite mold when said molds are mated.

* * * * *